US007454791B1

(12) United States Patent
Godwin (10) Patent No.: US 7,454,791 B1
(45) Date of Patent: Nov. 18, 2008

(54) METHOD AND SYSTEM FOR CHECKING THE SECURITY ON A DISTRIBUTED COMPUTING ENVIRONMENT

(75) Inventor: Debbie Ann Godwin, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 09/404,275

(22) Filed: Sep. 23, 1999

(51) Int. Cl.
*G06F 11/30* (2006.01)
(52) U.S. Cl. ....................................... 726/25
(58) Field of Classification Search ............... 726/25
See application file for complete search history.

(56) References Cited

U.S. PATENT DOCUMENTS

| 5,550,984 A | * | 8/1996 | Gelb | 709/245 |
| 5,812,763 A | * | 9/1998 | Teng | 726/25 |
| 6,301,668 B1 | * | 10/2001 | Gleichauf et al. | 726/25 |

* cited by examiner

*Primary Examiner*—Christian LaForgia
(74) *Attorney, Agent, or Firm*—David A. Mims, Jr.; Dillon & Yudell LLP (57) ABSTRACT

An automated method for checking the adequacy of security in a distributed computing environment (DCE) consisting of a client and a server(s). The method comprises of first loading a DCE security tool on the DCE server/client machine. The security is a software application which instantiates the security checks of the invention. The DCE security tool is executed on the DCE by entering an executable command on the client or the server. This causes the DCE security tool to automatically search for security violations or warnings and output a resulting report with any violation or warning found.

36 Claims, 9 Drawing Sheets

METHOD AND SYSTEM FOR CHECKING THE SECURITY ON A DISTRIBUTED COMPUTING ENVIRONMENT

BACKGROUND OF THE INVENTION

1. Technical Field

The present invention relates in general to distributed computing environments (DCE) and in particular to security of DCEs. Still more particularly, the present invention relates to a method and system for checking the health of the security of a DCE.

2. Description of the Related Art

Computer networks are well known in the arts and continue to grow in both size and complexity. This growth is fueled by more computers being connected to networks and connecting networks to other networks. These connections enable computers to work together efficiently, and to simplify sharing resources such as files, applications, printers, and even special computers.

The Open Systems Foundations ("OSF") Group developed the Distributed Computing Environment ("DCE"). DCE transforms a group of networked computers into a single, coherent computing engine. DCE masks differences among different kinds of computers, thereby enabling users to develop and execute distributed applications that can tap into a network's latent power, using widespread resources such as storage devices, CPU's, and memory. The distributed parts of these application can execute concurrently, and thus, they are much more powerful than single processor applications that act on data sequentially.

The Distributed Computing Environment (DCE) software provides an enormous opportunity to transform a group of networked computers into a single, coherent computing engine. As a layer of software that masks the differences among different kinds of computers, DCE enables a user to develop and execute distributed applications that can tap into a network's latent power, using widespread resources such as storage devices, CPUs, and memory. Because distributed parts of these applications can execute concurrently, they can be much more powerful than single-processor application that must act on data sequentially.

With a standard network (i.e., non-DCE), the applications are executed on the individual machine or a local server host. Typically, each user must first provide his or her identity by using a secret password to log onto the local host. The local host uses the password, which is known only to the user and the local host, as proof that the user is who he or she claims to be. Once the user logs onto the local host, the host resources are usually protected further by means of permissions or privileges associated with each file. The permissions regulate whether a user can read, write or execute that file. The number of users on a single local host is typically small enough so that the host alone can manage all of the passwords and permission functions.

A distributed computing environment, on the other hand, might support thousand of users accessing files on any of hundreds or thousands of local hosts in the environment. Because it is impractical to maintain every DCE user's security information on every host in the environment, DCE serves security information from a centralized database. This database, along with a distributed set of daemons and libraries, compose the DCE security service.

Many kinds of computers use a variety of measure to protect resources such as files and applications from unauthorized access. When servers enforce the security, each client must provide its user's identity and access rights. These are provided on the first remote procedure call (RPC), and sometimes in highly secure environment, on every RPC call. Because access to every DCE resource—directories, files, printers, and so on—is controlled by a server, the server's typically require comprehensive network security for authentication and authorization.

A cell is the basic unit of operation and administration in DCE. A cell is a group of users, systems, and resources that typically have a common purpose and share common DCE Services. At a minimum, the cell configuration includes the Cell Directory Service, the Security Service, and the Time Service.

The DCE Security Service has been utilized to authenticate all DCE users and servers, making certain that people and programs using DCE are who they claim to be. Furthermore, resource administrators can protect distributed resources from unauthorized access using the authorization capabilities of the DCE Security Service.

In an authenticated environment, users and servers, known as principals, must prove their identities before being allowed to accomplish a task. This proof is in the form of a special kind of password. When a user enters a password at login, an authentication server verifies it against the data stored for that user in the authentication database. Principals within a cell share a common authentication server and database. If the security of a cell's authentication server is compromised, all passwords in that cell must be changed because they can no longer be considered secure. The larger the cell, the more work it can be to repair the damage resulting from a breach of security.

In DCE, the security service, which is also known as a registry, serves a single source of security and manages information about users, groups, and the like. This gives a company a single place to define and manage users. One limitation to this approach is the propagation of passwords. Additionally, most security checks are performed manually by a system administrator. This tends to be rather time consuming and inefficient and susceptible to human error.

Unfortunately, distributed computing environments provide some security concerns particularly, how to protect data that must be shared among multiple users. Highly publicized network break-ins have alerted everyone to the vulnerability of distributed systems. Different kinds of networked computers use different security mechanisms that often do not operate together seamlessly or, more frequently, do not operate together at all. Such a patchwork of security mechanisms often leaves security holes that attract network snoopers and eavesdroppers.

When clients use servers in other cells, the cooperating cells must share a password. Thus a DCE environment with 5 cells that cooperate with each other cell must maintain 20 passwords for complete intercell operation. Each cell administrator maintains a separate account and password for the other 4 cells, exchanging replacement passwords with other cells' administrators when they expire or when the security of a cell's authentication server is compromised. This may not be a problem in DCE environments with 5, 10, or even 20 cells, but it may be a problem if 100 cells (sharing 9,801 passwords) must get new passwords.

The DCE software provides a secure environment for clients to conduct business and therefore it is immensely important to DCE and Distributed File Server (DFS) servers in the cell, to be security compliant.

Resources such as servers, directories, files, or even records in databases can have an associated access control list (ACL) that specifies which operations can be performed by which user. When a file or directory can be accessed by anyone, it is termed "world readable" or world writable."

DCE components and applications can use different kinds of ACLs to protect their resources. The types of ACLs and their exact effects depend on how they are defined by the ACL manager for the specific component or application. If a user wishes to use ACLs to protect his application's resources, he must write his own ACL manager.

DCE provides a secure operating environment when in use (i.e, transporting packets over the network from one DCE client machine to another DCE client machine), therefore ensuring the actual DCE software installed on the AIX machine is secure is of utmost importance.

A DCE administrator manages aspects of a cells DCE security. This very manual and timely process must be performed by all DCE administrators and users who also are required to document the results manually.

The present invention appreciates the fact that it would be desirable to provide a method and system for automatically checking the security health of a DCE. It would further be desirable to be able to automatically correct problems with the security of a DCE.

SUMMARY OF THE INVENTION

It is therefore one object of the present invention to provide an improved distributed computing environment (DCE).

It is another object of the present invention to provide a method and system for improving security on DCE server(s) and client(s).

It is yet another object of the present invention to provide a method and system for improving the security of a DCE by automatically checking the health of the security via a program application.

The foregoing objects are achieved as is now described. An automated method is disclosed for checking the adequacy of security in a distributed computing environment (DCE) comprising client(s) and server(s). The method comprises of first loading a DCE security tool on the AIX machine which is a DCE server or client. The security is a software application which instantiates the security checks of the invention. The DCE security tool is executed on the DCE client or server machine by entering an L executable command on the client or the server. This causes the DCE security tool to automatically search for a security violation or warning and output a result with any violation or warning found.

In a preferred embodiment, the DCE security tool checks the user access codes, the file and directory permissions and ownership, and whether certain required files exist on the DCE server or client machine. The outputs indicate to a system administrator what steps need to be taken to beef-up the security of the DCE. In a preferred embodiment, the administrator corrects the security errors and the program code is re-run to ensure that all errors have been fixed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
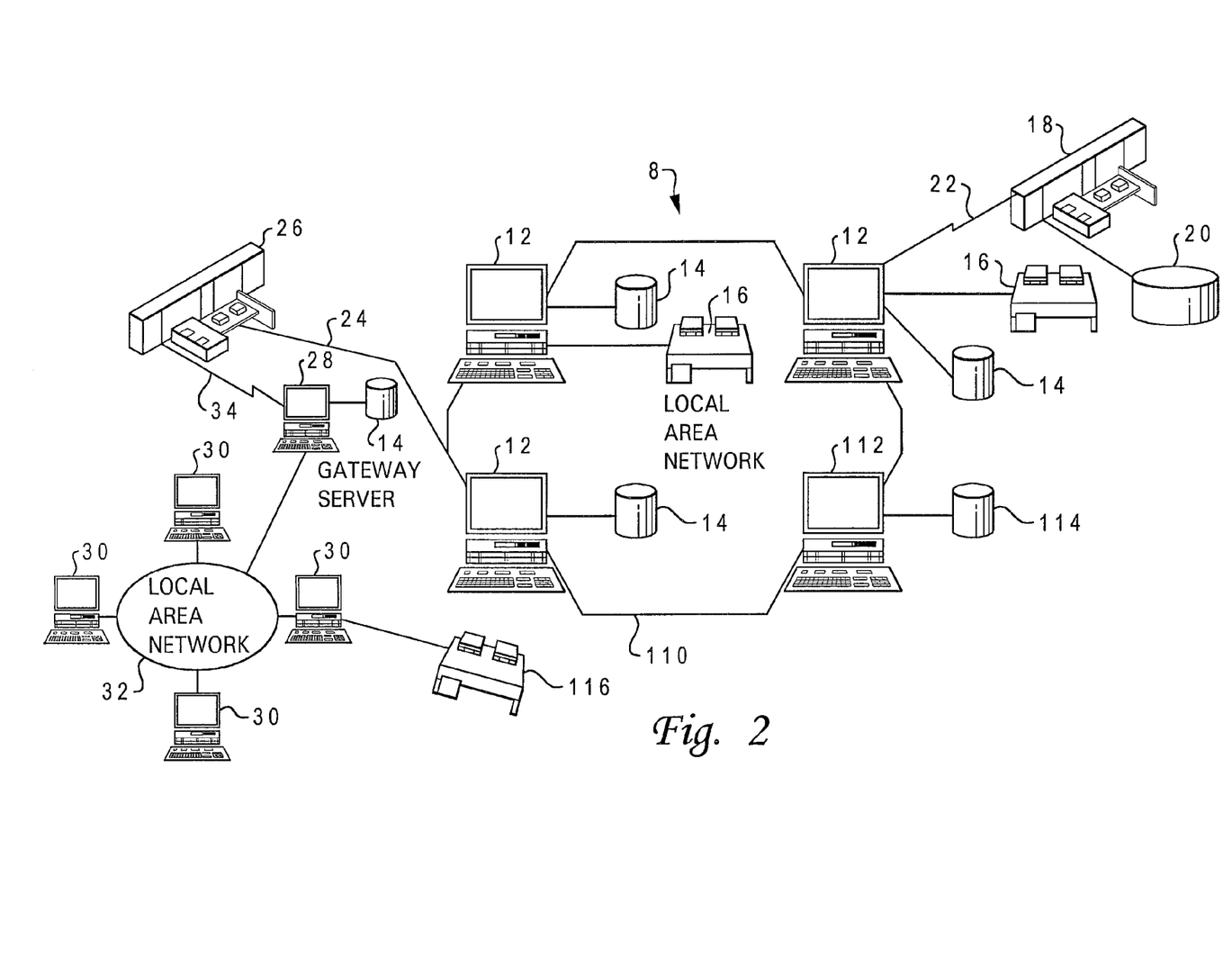
FIG. 2 illustrates a distributed computing environment (DCE) in accordance with a preferred embodiment of the present invention.

The present invention is directed to a method for implementing a security health checking mechanism on a distributed computing environment (DCE) such as the DCE of FIG. 2. The invention may, however, be implemented in other configurations of terminals and networks and, while the present invention may be described with reference to the provided Figures, these references should not be construed in a limiting sense.

The invention is implemented as a software tool which automates preforming security health checks to ensure the DCE software on the machine (clients and servers) is secure its and in an audit ready state. In the illustrative embodiments, the software tool shall be interchangeably referred to as DCE-COPS and/or security tool.

In a preferred embodiment, the tool performs security checks according to International Business Machine (IBM) Corporation's *Security Standards For Providers of Network and Computing Service* which is hereby incorporated by reference and published on the Internet at http//w3. ibm.com/transform/cio.nsf /Files/ITCS204V2.1/$file/ ITCS204V2.1_CIO.htm on Aug. 15, 1999. The IBM's Security Standards For Providers Of Network and Computing Services establishes security practices for the protection of IBM's information assets on network and computing environments within IBM. This standard also defines the requirements for network infrastructures and system services which support IBM business processing and where the infrastructures and system services are provided to multiple users, including and services within the IBM.COM domain. In a preferred embodiment, Operating System Resources (OSR) file and directory, permissions and owners are verified under the mentioned standard which determines the configuration of the machine and verifies that default shipped passwords have been changed.

One advantage of using this tool with the IBM standard is that administrators can use the tool to automate required security checks on machines instead of performing the checks manually. The tool produces a log file that stores any security violations or warnings found, saving the administrator the work of documenting the results manually. Once the administrator has fixed any security exposures found, the tool is run again storing the latest results in the log file also.

Figure 1:
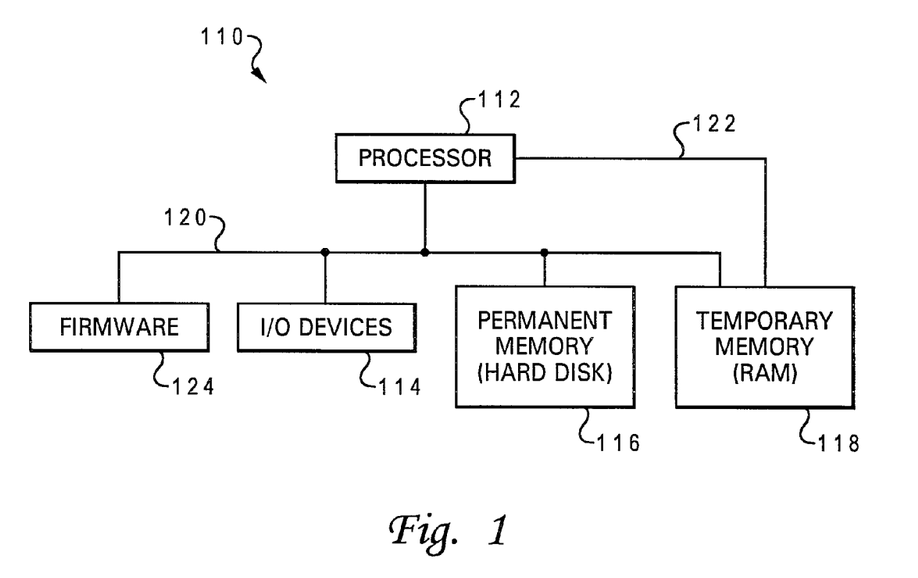
FIG. 1 depicts a data processing system, in which a preferred embodiment of the present invention may be implemented.

With reference now to the figures, and in particular with reference to FIG. 1, there is depicted the basic structure of a data processing system 110 utilized in the preferred embodiment of the invention. Data processing system 110 has at least one central processing unit (CPU) or processor 112 which is connected to several peripheral devices, including input/output devices 114 (such as a display monitor, keyboard, and graphical pointing device) for user interface, a permanent memory device 116 (such as a hard disk) for storing the data processing system's operating system and user programs/applications, and a temporary memory device 118 (such as random access memory or RAM) that is utilized by processor 112 to implement program instructions. Processor 112 communicates with the peripheral devices by various means, including a bus 120 or a direct channel 122 (more than one bus may be provided utilizing a bus bridge).

Data processing system 110 may have many additional components which are not shown such as serial, parallel, and USB ports for connection to, e.g., modems or printers. In the preferred embodiment of the invention, communication to the data processing system is made possible via a modem connected to a land line or wireless cellular telephone system which is in turn connected to other components to create a network or distributed system. A distributed system may be a wide are network (WAN) such as an Internet. Additionally, data processing system may be connected to a distributed system via an ethernet/network card. Communicated data arrives at (or is sent through) the modem or network card and is processed to be received by the data processing system's CPU or other software application. In a preferred embodiment, a data processing system operates as a condition detection component for analyzing and recognizing conditions of interest in a distributed system. The data collection components may also be data processing systems.

Those skilled in the art will further appreciate that there are other components that might be utilized in conjunction with those shown in the block diagram of FIG. 1; for example, a display adapter connected to processor 112 might be utilized to control a video display monitor, and a memory controller may be utilized as an interface between temporary memory device 118 and processor 112. Data processing system 110 also includes firmware 124 whose primary purpose is to seek out and load an operating system (OS) from one of the peripherals (usually permanent memory device 116) whenever the data processing system is first turned on. In the preferred embodiment, data processing system contains a relatively fast CPU 112 along with sufficient temporary memory device 118 and space on permanent memory device 116, and other required hardware components necessary for providing quick evaluation of events within a condition detection environment.

Referring now to FIG. 2, there is depicted a pictorial representation of a distributed data processing system 8 or distributed computing environment (DCE) system, which may be utilized to implement the method and system of the present invention. As may be seen, distributed data processing system 8 may include a plurality of local resource networks, such as Local Area Networks (LAN) 110 and 32, each of which preferably includes a plurality of individual computers 112 an 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 114 and/or a printer/output device 116. One or more such storage devices 114 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 114 which is associated with a Resource Manager or Library Service, which is responsible for maintaining and updating all resource objects associated therewith.

Still referring to FIG. 2, it may be seen that distributed data processing system 8 may also include multiple mainframe computers, such as mainframe computer 18, which may be preferably coupled to Local Area Network (LAN) 110 be means of communications link 22. Mainframe computer 18 may also be coupled to a storage device 20 which may serve as remote storage for LAN 110. A second Local Area Network (LAN) 32 may be coupled to LAN 110 via communications controller 26 and communication link 34 to a gateway server 28. Gateway server 28 is preferable an individual computer or Intelligent Work Station (IWS) which serves to link LAN 32 to LAN 110.

As discussed above with respect to LAN 32 and LAN 110, a plurality of data processing procedures or documents may be stored within storage device 20 and controlled by mainframe computer 18, as Resource Manager or Library Service for the data processing procedures and documents thus stored.

Of course, those skilled in the art will appreciate that mainframe computer 18 may be located a great geographical distance from Local Area Network (LAN) 110 and similarly Local Area Network (LAN) 110 may be located a substantial distance from Local Area Network (LAN) 32. That is, Local Area Network (LAN) 32 may be located in California while Local Area Network (LAN) 110 may be located within Texas and mainframe computer 18 may be located in New York.

It is often desirable for users within one portion of distributed data processing network 8 to access a data object or document stored in another portion of data processing network 8. The data processing procedures and documents may be accessed by enrolled users within distributed data processing system 8 and periodically "locked" to prevent access by other users. However, in a preferred embodiment, it is the system administrator who controls access and performs modifications for security.

Figure 3A:
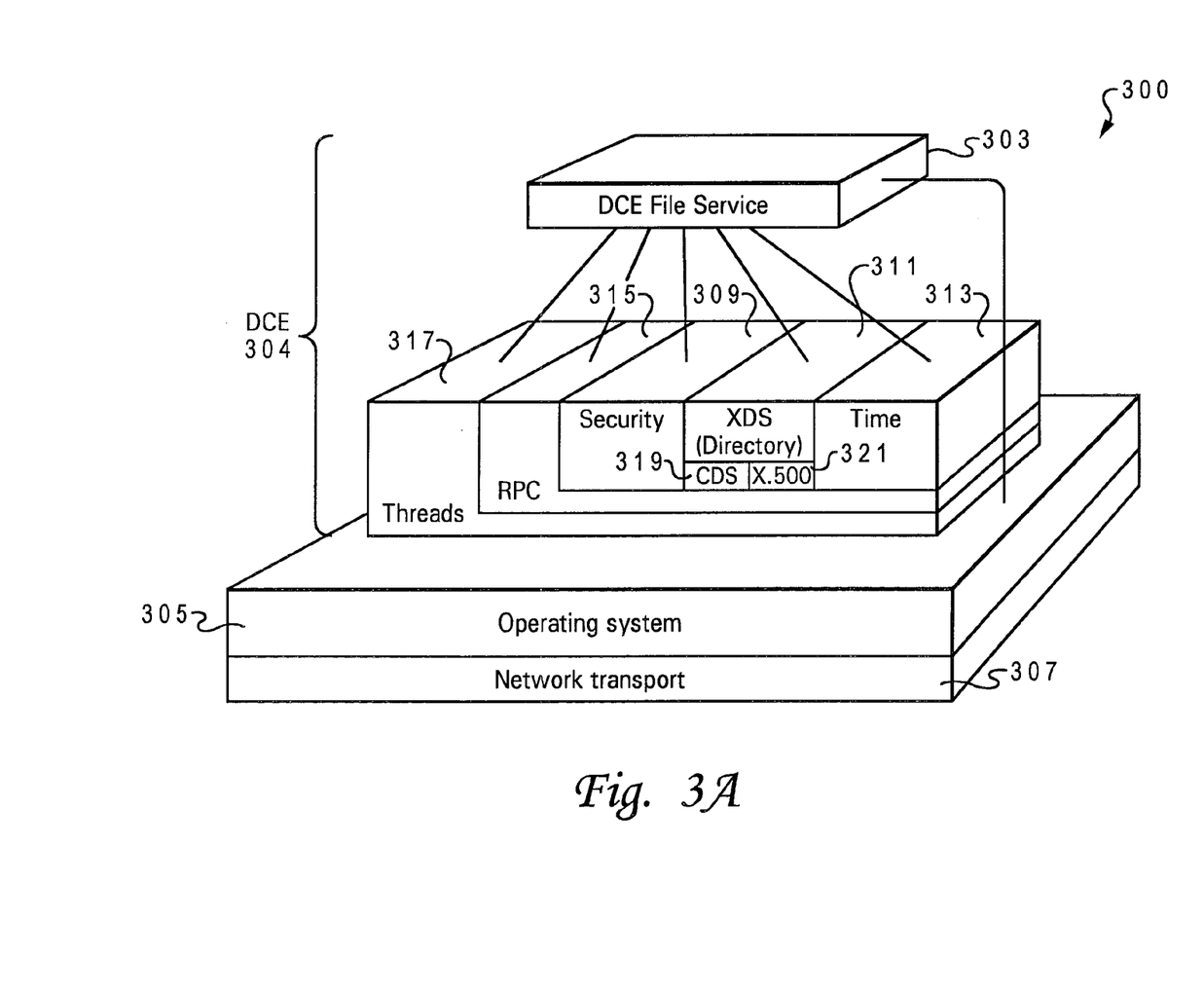
FIG. 3A is a high-level block diagram of a DCE application programming interface in accordance with a preferred embodiment of the present invention.

FIG. 3A depicts a block diagram of a DCE application programming interface 300 that provides for a DCE file service 303. DCE is a layer 304 of software that masks difference between various kinds of hosts. As a layer 304, it sits on top of a host operating system 305 and networking services for network transport 307. The DCE distributed services, which include security 309, directory 311, time 313, remote procedure call ("RPC") 315, and thread services 317. RPC 315 and threads 317 are base DCE services that are available on every system on which DCE is installed. FIG. 3A further shows how the DCE file service 303 is similar to an application that uses the underlying DCE services for distribution. DCE directory service further consists of a cell directory service 319 ("CDS") and a global directory service ("GDS") such as X.500 321, which programs use by calling the directory service ("XDS") application programming interface ("API"). The invention is concerned with ensuring that the security measures 309 in place on a DCE are adequate.

In the preferred embodiment, administrators use the security tool to automate required security checks on machines (such as data processing systems) instead of performing a check manually. The security tool produces a log file that stores any security violations or warnings found. Once the administrator has fixed any security exposures found, the tool stores the latest results in the log file also.

This security tool preferably operates on AIX DCE/DFS clients and servers of the network. It automates performing security health checks to ensure the DCE software on the machine is secure and in an audit ready state. The need for all machines to be security compliant to pass audits including Operating System software as well 30 as all other software installed, configured and running on the machine, has been described in the background section.

Utilizing the security tool, Operating System Resources (OSRs), file and directory, permissions and owners are verified according to the mentioned standard. The tool also allows for the determining the configuration of the machine and verifying that default shipped passwords have been changed. The specific checks that the tool performs are outlined below and referenced in Appendix A, which is attached (the assignee of the present invention retains all copyrights in said Appendix and other attached Appendices).

Figure 3B:
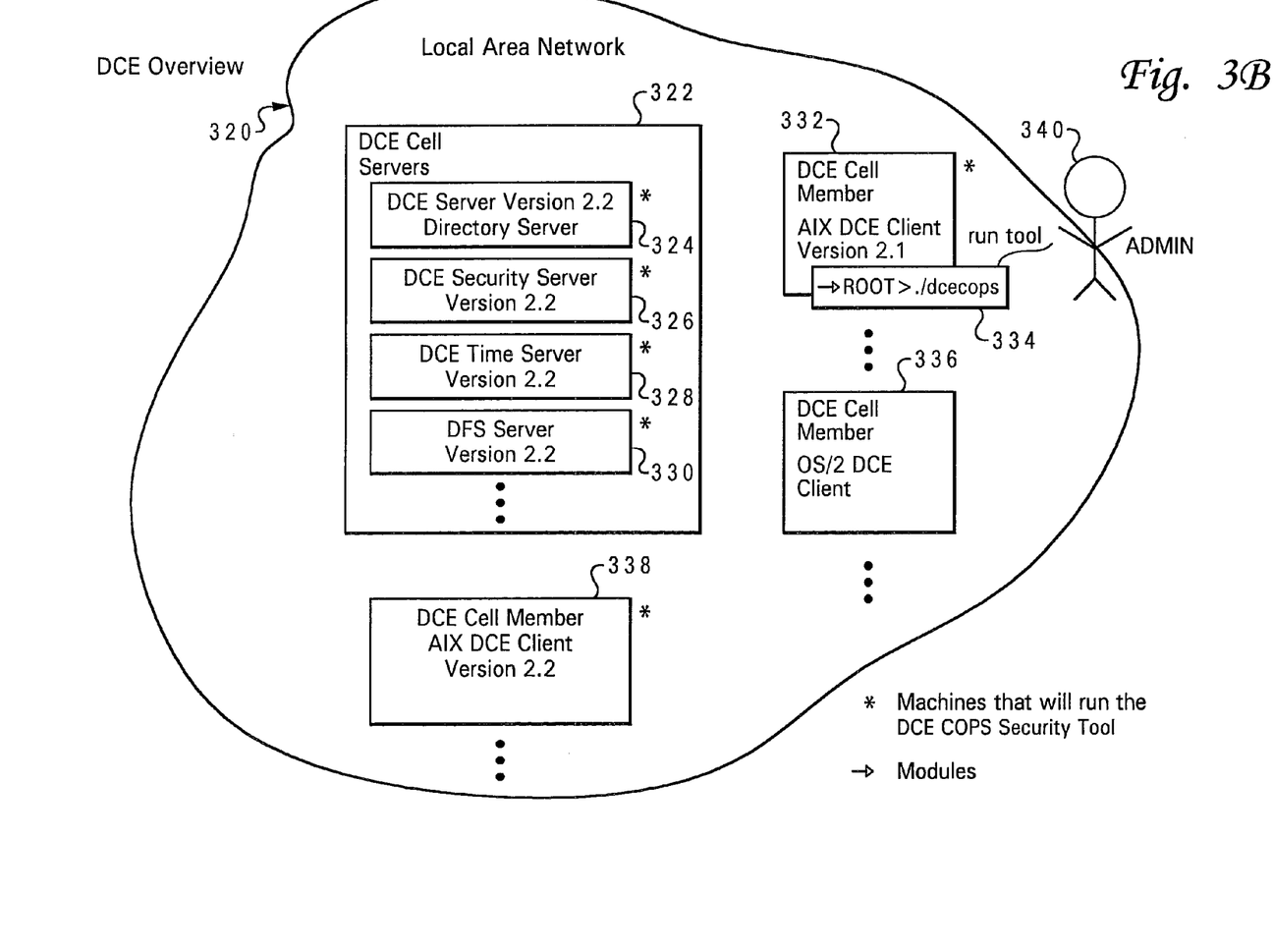
FIG. 3B is a block diagram of the DCE modules which run the security software in accordance with a preferred embodiment of the present invention.

FIG. 3B depicts a LAN 320 containing a DCE server 322 and cell members (cells) 332, 336, and 338. DCE is made up of DCE/DFS server machines 322 which includes a DCE directory server 324, DCE security server 326, DCE time server 328, and a DFS server 330. DCE cells are machines on the LAN which are running the DCE client software. These cells run various DCE clients, including AIX DCE client version 2.1 332, OS/2 DCE clients 336, and AIX DCE client version 2.2 338. The security tool preferably runs and performs checks on the AIX platform, although other platforms are conceivable. The security tool is run by a system administrator 340 via a command module 334 on the DCE cell.

In the preferred embodiment, the tool, "DCECOPS", is an executable program for the AIX operating system that is written in C++. DCECOPS is comprised of a collection of several C++ classes compiled to generate the dcecops executable. The DCECOPS program does not use the DCE C APIs, but is merely a C++ program which performs the file permission, file owner, and other checks against AIX DCE files and directories. In another embodiment, a second 30 program, referred to herein as "DCEAUTH" is affiliated with the security tool. DCEAUTH is a DCE C++ program. It takes parameters from the DCECOPS and uses the DCE 'C' Application Programming Interface (API) to verify DCE passwords.

The security tool is run by the system administrator, as root, on an AIX machine running a DCE or DFS server, or a DCE client. As the security tool is being run and the checks are being performed, a report is generated indicating any warnings or violations found in the DCE software per the checks the tool is performing.

The security tool generates a report of every use. The report is written to "stdout," (i.e., the screen), and also to a default file on the system or a file specified by the administrator running the tool. (see Appendix A, Invocation Examples). In a preferred embodiment, any warnings and/or violations received during the first run of the tool is fixed by the system administrator and the security tool is run again. This process is repeated until all warnings and violations are fixed. The reports generated during implementation of the dcecops tools are stored and may be used by the administrator as evidence during an audit to show any previously existing violations and when the violations were fixed.

The tool automates the following security requirements:

Ads (A) DCE Passwords—In many cases, default passwords are shipped with operating systems and program products for use during system and product installation and setup. These default passwords must be changed as soon as possible during or following their initial use. The tool checks to ensure that passwords being utilized after initial operations are not the default passwords.

(B) DCE Server/Client Operation System Resources (OSR)—In a secured system, all files and directories under "/var/dce" are owned by an AIX administrative userid, as identified in Appendix D, and must not be updatable by general users. The tool ensures that these files and directories are owned by an AIX administrative userid and an AIX administrative groupid, and that the UNIX permission bits are set to not allow 'other' write access. Some exceptions to this requirement are recognized (i.e., permission settings on the following directories and files can be set with world-writable access, per DCE design). These exceptions include:
  1. /var/dce/security/creds;
  2. /var/dce/rpc/socket;
  3. /var/dce/adm/directory/cds/cdsLib;
  4. /var/dce/security/adm/dceunixd/dceunixd.skt (dceunixd.skt0 for DCE 2.2);
  5. /var/dce/config (DCE 2.2 only);
  6. /var/dce/security/pk_file (DCE 2.2 only); and
  7. /var/dce/tmp (DCE 2.2 only)

Also, in a secured system, the directory "/krb5" is owned by root and is not updatable by non-administrative userids.

(C) DCE Server/Client Operating System Resources—The tool ensures that the following directories are owned by root and are not updatable by non-administrative userids:
  1. /var/dce/dfs
  2. /var/dce/dfs/adm
  3. /var/dce/dfs/adm/dfsbind
  4. /var/dce/dfs/adm/salvage
  5. /var/dce/dfs/backup
  6. /var/dce/dfs/backup/butc
  7. /var/dce/dfs/aggrs
  8. /var/dce/dfs/BosConfig
  9. /var/dce/dfs/admin.bak
  10. /var/dce/dfs/admin.bos
  11. /var/dce/dfs/admin.ft
  12. /var/dce/dfs/admin.fl
  13. /var/dce/dfs/dfstab (E) DFS Server Operating System Resources—The tool ensures that all files and directories under "/var/dce" are owned by an AIX administrative userid are not updatable by general users. The tool ensures that these files and directories are owned by the AIX administrative userids, as identified in Appendix D, or the AIX administrative groupid, and that the UNIX permission bits are set to not allow 'other' write access. there are several exceptions, which are similar to the exceptions of B above. Also, the tool ensures that the directory "/krb5" is owned by root and is not updatable by non-administrative userids. The tool further ensures that non-administrative userids may not have read or write access to the DFS cache directory (default location /var/dce/adm/dfs/cache).

DCECOPS Details

The parameters used within DCECOPS are now presented. In the preferred embodiment, users are allowed to specify certain parameters to control the actions of the security tool. When the user fails to specify these parameters, the program runs using default values. The parameters with their descriptions include:
- -o <Path to place output report>
  Directory in which the output file is to be placed.
  This can be local directory or an AFS or DFS directory. Specify only the directory. The filename is <date>.dce (ie, 19990215.dce). If not specified, the file is automatically placed in /<hostname>/dcecops.
- -v Verbose Mode
  If not specified, the output file is overwritten with each run of this program.
- -h Help
  Usage statement displayed even if there are other command line args.
- -? Help
  Usage statement displayed—same as -h.

An example of the use of the parameters within DCECOPS is presented as:

dcecops -v -o /home/userone/bin

[Appendix B illustrates a typical output report] In a preferred embodiment, the output or program returns are:
- -1—Program abort error. Must be root to run DCE is not installed;
- 0—Completed OK. No warnings or violations;
- 1—Warnings; and
- 2—Violations.

Figure 4A:
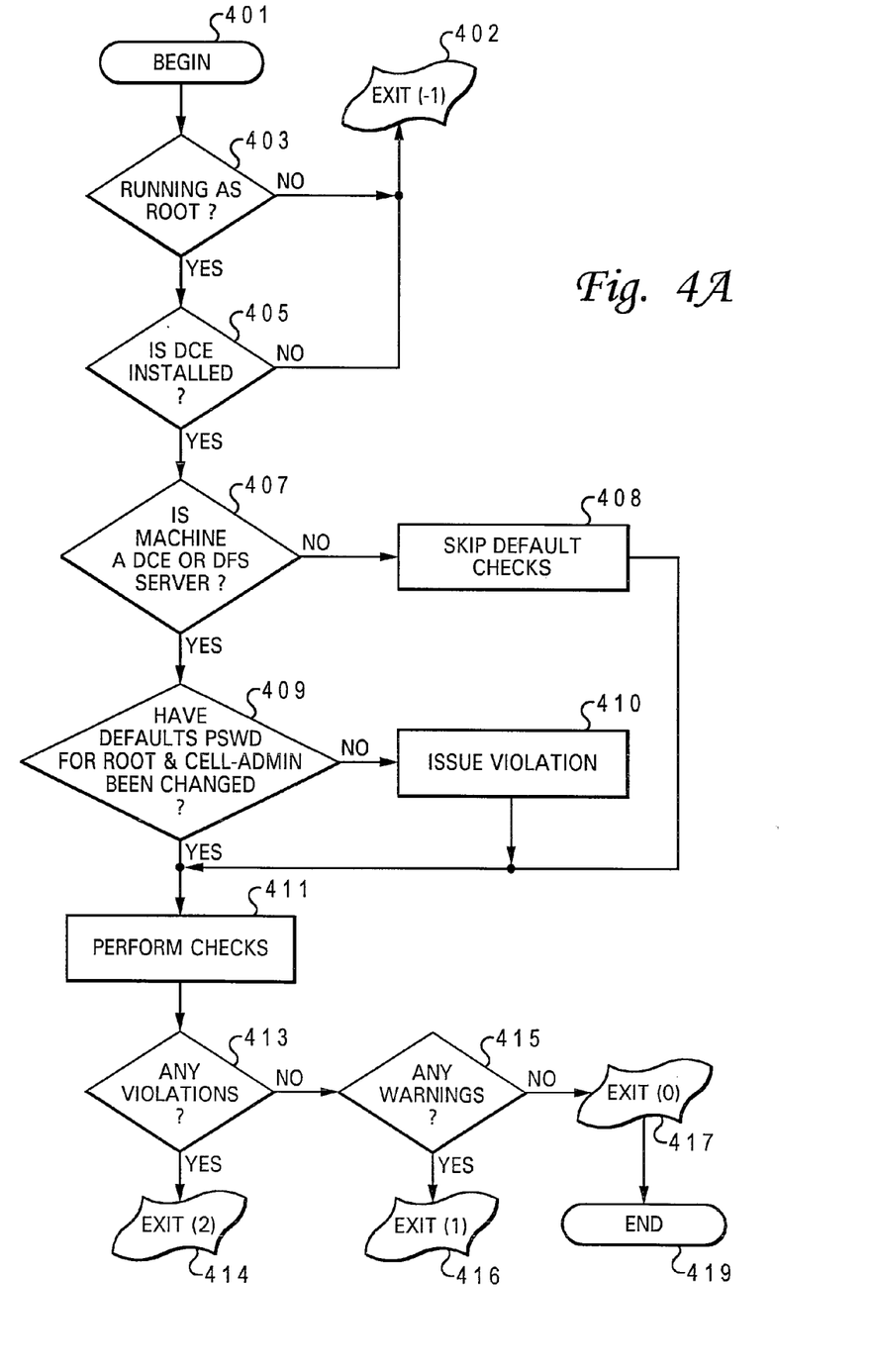
FIG. 4A is a high level flow chart of the process of checking for security violations on a DCE machine in accordance with a preferred implementation of the present invention.

FIG. 4A depicts the process of checking DCE security using the security tool. The process begins (step 401) by checking if the machine ID running the security tool (program) is root (step 403). If it is not root, the program exits with a "-1" (error) return value, and a message (step 402). Next, the program determines if DCE is installed on the machine (step 405). This process involves checking if the directory "/opt/dcelocal" is on the machine. Finding this directory indicates to the program that DCE is installed. If DCE is not installed, the process reports this and ends the program with a -1 program return (step 402).

Figure 4B:
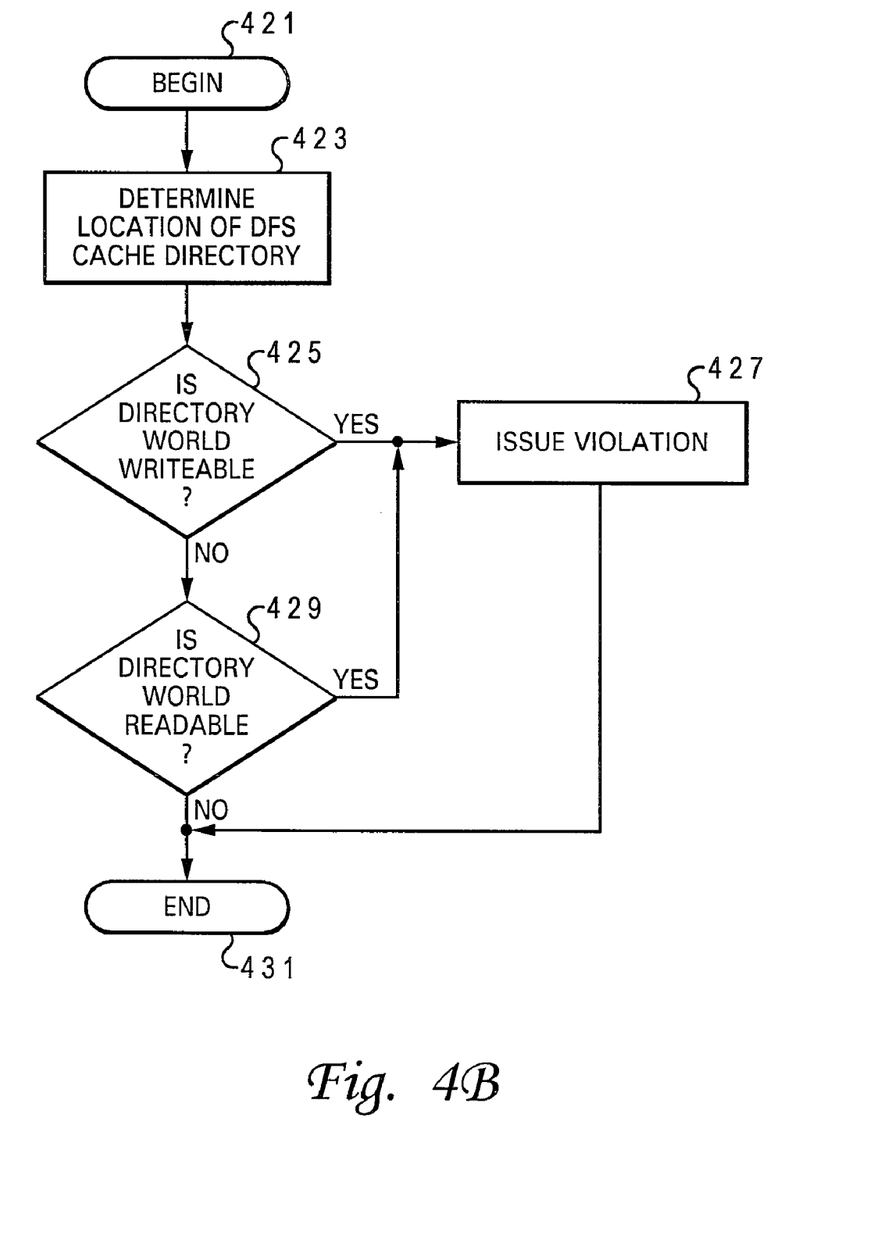
FIG. 4B is a high level flow chart of the process of checking a DCE client's security health in accordance with a preferred implementation of the present invention.
Figure 4C:
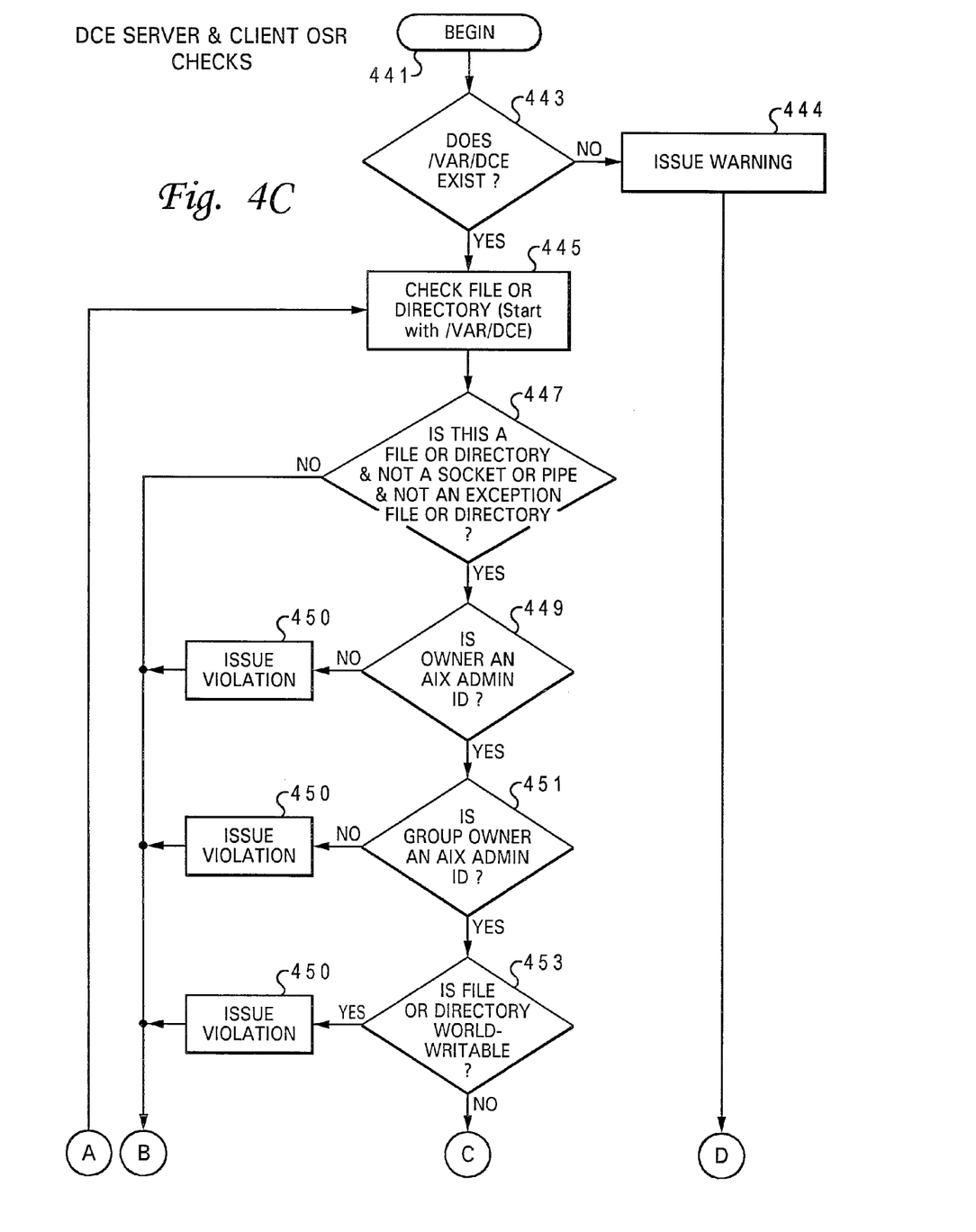
FIG. 4C is a high level logical flow chart depicting the process of performing a DCE server and client operating system resource (OSR) check in accordance with a preferred implementation of the present invention.
Figure 4D:
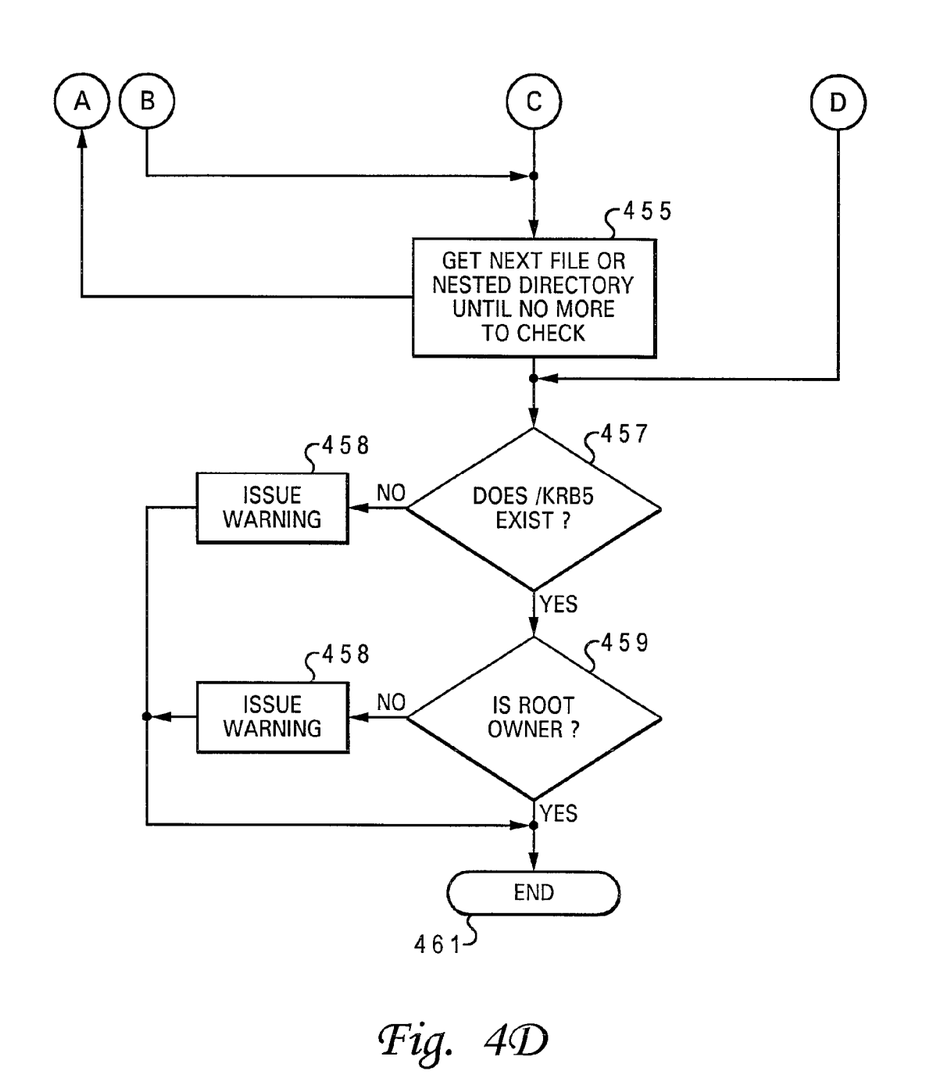
Figure 5:
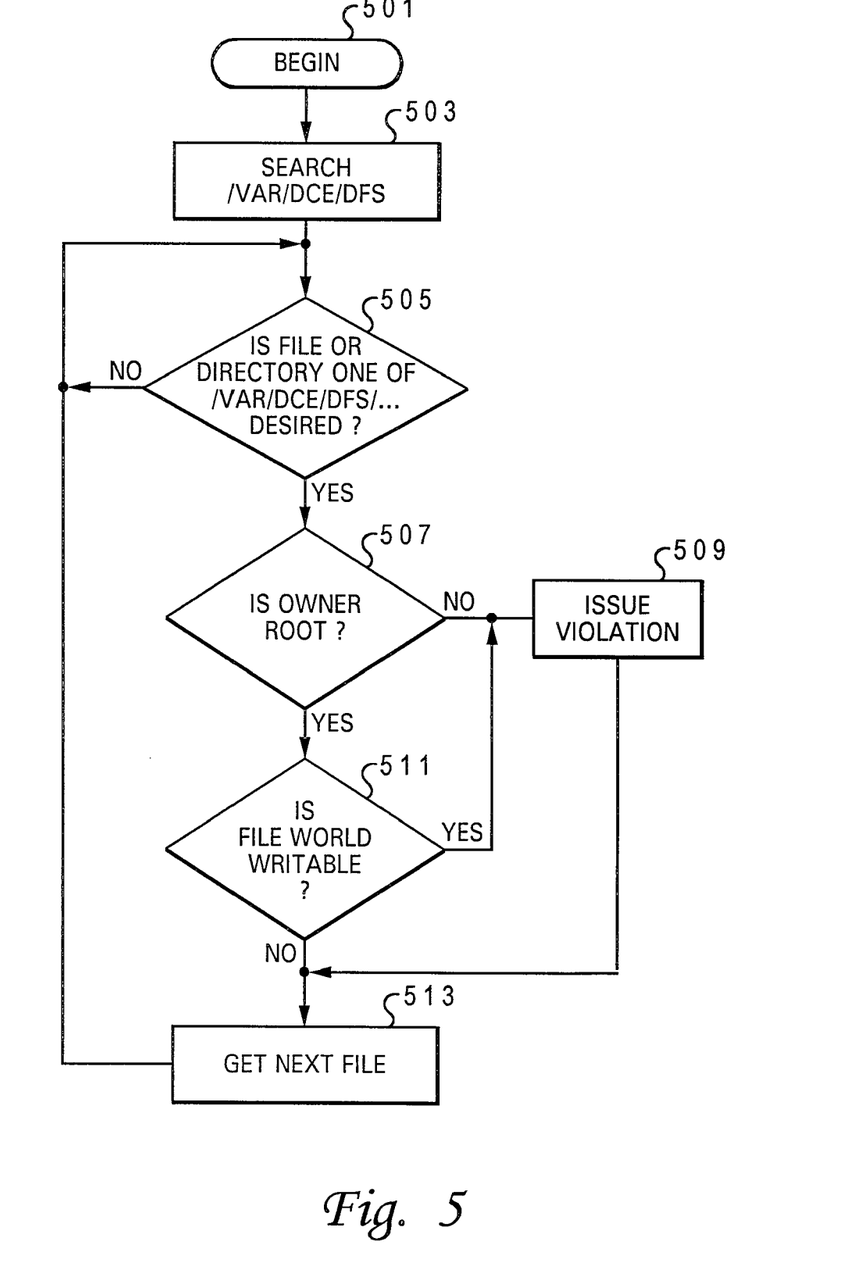
FIG. 5 is a high level flow chart of the DFS server checks in accordance with a preferred implementation of the present invention.

The program then checks whether the machine is a DCE or DFS server (step 407). If the machine is a DCE or DFS server, the program checks to ensure the default shipped DCE passwords for DCE IDs cell_admin and root have been changed (step 409). If the default password (-dce-) has not been changed, the program reports this as a violation (step 410). This check is only performed when running this tool on DCE or DFS server machines since only the DCE administrator has the proper authority to change these passwords. Thus, if the machine is not a DCE or DFS server, the program skips the default checking step (step 408). The program then performs a series of checks (step 411). These checks are illustrated in FIGS. 4B, 4C and 5, and described below. The program then determines if any violations were found (step 413). If violations were found the program exits with an appropriate message, exit(2) (step 414). If no violations were found, the program then determines if any warnings were issued (step 415). If warnings were issued, the program exits with the appropriate message, exit(1) (step 416). If no warnings were issued, the program exits successfully, exit(0) (step 417). Then the process ends(step 419).

In a preferred embodiment, the dcecops program calls a stand alone executable, dceauth (DCE Authentication Program), passing it the DCE ID and DCE password as parameters. The dceauth utility program verifies a users DCE ID and password without actually logging on the DCE ID. It is coded using the C program DCE APIs so it runs as a DCE executable program. The output of the program is "0" if the password is valid for the given DCE ID. If the password is not valid for the given DCE ID, the output of the program is "1." The specific check performed here is "<program> cell_admin -dce-"[1] and "<program>root -dce-". If either check returns a 0, then a violation is issued for not having changed a default shipped password.

FIG. 4B is a high level flow chart illustrating a check of the access allowed to DCE directories. This process/ check is performed in step 411 of FIG. 4A. The process begins (step 421) by the program determining the location of the DFS cache directory (step 423). A check is made to determine whether the directory is world-writable (i.e. if any one other than an authorized user can write to the directory) (step 425). If the directory is world-writable, a violation is issued (step 427). A second check is then made to determine if the directory is world-readable (i.e. any one other than an authorized user may access the contents of the directory) (step 429). If the directory is world readable, then a violation is issued (step 427). Then the process ends (step 431).

An example script which is packaged with the tool to handle the sending of mail or gathering of file(s) and sending them as mail is illustrated in Appendix C. During implementation, the script checks the program return to determine if there were any warnings or violations or system errors. The script handles sending any mail, not the actual tool. This provides more flexibility to administrators on the AIX platform for site customization if desired. An example of a script command is:

dcecops|mail -s "dcecops output"
adminus@xx.ibm.com

The report file name always defaults to <date>.dce. The output path and filename is specified in the on screen output. If the -o option during program invocation is not used, the report is placed in the default directory and file and is also outputted to the screen. The default directory /<hostname>/<toolname> is created if it does not already exist, and the file "YYYYMMDD.dce" is placed in this directory. If the -o option is used, the report file is placed in the directory specified in the -o option. The file name YYYYMMDD.dce remains the same (i.e., only the directory is different.) The resulting file location thus looks like /myhost/dcecops/19990215.dce DCE Server/Client Operating System Resources Checks The OSR checks involves a check of a long list of files and directories. If any of the files or directories are missing, no violations are reported since DCE cannot possibly be running successfully if DCE files are missing. If the base OSR directories are missing, it is reported as a warning. The directories which are checked and reported as warnings (if missing) include /var/dce and /krb5.

At the end of the program, the report is printed with a total of warnings and violations. (Note: The only warnings reported are if DCE seems to be installed (i.e., /opt/dcelocal exists), but directories /var/dce or /krb5 do not exist. This condition yields one of the following outputs:

WARNING: The directory /var/dce does not exist. Verify your installation of DCE.

WARNING: The directory /krb5 does not exist. Verify your installation of DCE.)

All other files found on the system, that are not in compliance, are reported as violations.

FIG. 4C is a flow chart of the process of DCE/DFS Server and DCE Client checks The process uses a starting directory, such as /var/dce, and walks the files and nested directories in that directory. The process begins (step 441) by checking if the /var/dce directory exists (step 443). If the directory does not exist, a warning is issued (step 444). A check of the files and/or directories is then initiated (step 445). The program first determines if the item is an included file or directory (i.e.

not a socket or pipe and not one of the files or directories excepted) (step 447). If the file is one of the included file or directory, the program then checks whether the owner is an AIX administrative ID (step 449). If the owner is not an AIX administrative ID, a violation is issued (step 450). Then a check is made for whether the group owner is an AIX administrative ID (step 451). If the group owner is not an AIX administrative ID, a violation is issued (step 450). If the group ID is ok, then the permissions on the files or directories are checked. The file or directory is checked to determine if it is world writable (step 453). If it is world writable, a violation is issued (step 450). Then the next file or nested directory is obtained (step 455) until all files under /var/dce are checked. A check is then made of whether the /krb5 directory or file exists (step 457). If the /krb5 file or directory does not exist, a warning is issued (step 458). A check is made of whether the owner of the file or directory is root (step 459). If the owner is not root, a warning is issued (step 458). Then the process ends (step 461).

In step 453, the directories that are checked are those within/var/dce. Some exceptions apply when permission settings on the directories and files can be set with world-writable access, per DCE design. These exceptions are provided in item B of the automated security requirements listed above.

Code Examples

The function which performs the various checks processes the /var/dce directory and looks at all of it's files. The function is a recursive function call. When a directory within the /var/dce directory is encountered, the function calls itself to process nested directories. All files and directories encountered under the /var/dce directory are checked with the exception of the exception files in item B using the C programming language "stat" function to check file ownership and permissions. An illustrative code example is: struct stat status;
    stat(filename, &status);

In a preferred embodiment, only files and directories are checked. Socket or pipe files are not examined as they do not fall in the scope of the security health checking requirements. To implement this the following code example is utilized:
    if ((!S_ISSOCK(status.st_mode)) &&
    (!S_ISFIFO(status.st_mode)) &&
    (not one of the exception files)), then run the following checks.
        First, check the owner of the file. If the owner is NOT an AIX administrative ID, then a violation is reported. This code example is:
    if(status.st_uid !=0 && status.st_uid ..., check all the AIX administrative IDs), report a violation and move to next file.

As soon as a violation is reported for one of the files or directories, the checking is stopped for that file or directory and the same set of checks are run for the next file or directory. If the first check was passed, then the group owner of the file is checked. If the file is not owned by an AIX administrative group, a violation is reported. The code example is:
    if (status.st_uid !=check all AIX admin groups), report a violation and move to next file.

If this second check is passed, the next check is run.
Next, the file permissions are checked.
Is the file world-writable?
    Test for other-write access S_IWOTH
        if (status.st_mode & S_IWOTH), report violation.
Get the next file or nested directory and call the recursive check.

Once all files under /var/dce have been checked, the following check is performed:
    /krb5 (owner must be root—contains no nested directories). If the /krb5 directory does not exist (457), a warning is issued (458). If it does exist, the C stat function is called and the owner is checked as done in the code example below, to ensure root is the owner of the file (459).
    struct stat status;
    stat("/krb5", &status);
    if(status.st_uid !=0), report violation (458).

In secured systems, non-administrative userids may not have read or write access to the DFS cache directory (default location /var/dce/adm/dfs/cache). This check is always performed since all DCE and DFS servers also have the DCE client installed. Next, the file permissions are checked in two separate checks. Each check is run individually for better message reporting to the administrator. A program example includes:
    Is the file world-writable?
        Test for other-write access S_IWOTH
            if (status.st_mode & S_IWOTH),
        report violation and move to next file.
    Is the file world-readable?
        Test for other-read access S_IROTH
            if (status.st_mode & S_IWOTH), report violation and move to next file.

FIG. 5 is a high level flow chart of a check on a DFS. The process begins (step 501) with the search for and locating of the DFS directory (step 503). A check is made of the associated files and/or directory for a match with a desired file or directories (step 505). This check is performed until a desired file or directory is found. When a desired file or directory is found, a check is made to determine if the owner is root (step 507). If the owner is not root, a violation is issued (step 509). If it is root, then the file is checked to determine it is world-writable (step 511). If the file is world-writable, a violation is issued (step 509). The next file is obtained for checking (step 513).

In the preferred embodiment, no other directories or files other than the ones pre-defined are checked. If files are missing, no violations or warnings are reported. As the function for the /var/dce checks is being run, it processes through each file and directory in the /var/dce directory, and recursively calls itself. Whenever any of the DFS files and directories listed above are encountered, a method to perform the needed checks is called. The checks that are performed against the above listed DFS files:

1. Must be owned by root.—The status structure from the original method is passed to this method to be examined. A sample code illustration is: if(status.st_uid !=0), report a violation and move to the next file; and
2. Must not be updatable by non-administrative userids.—Again, the status structure from the original method has been passed to this method, and when the check above for root owner is passed, this check is run. A sample code illustration is: if(status.st_mode & S_IWOTH), report violation and move to the next file.

Although the embodiment presented herein is described as a system that operates as a DCE system, it will be readily apparent to those skilled in the art that the present invention is not limited to a DCE implementation only, but is extendable to all distributed LANs that use a main or global system server that can accommodate foreign or remote registry services. Accordingly, although DCE is used in its properly accepted definition, that definition is extended in this disclosure to mean extended LANs or WANs having a plurality of non-common remote servers attached to a main system for allowing a user or plurality of users to maintain password synchronization across the non-common remote servers from their particular local host server.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

Finally, while the invention has been particularly shown and described with reference to a preferred embodiment, it will be understood by those skilled in the art that various changes in form and detail may be made therein without departing from the spirit and scope of the invention.

What is claimed is:

1. An automated method for checking the adequacy of security in a distributed computing environment (DCE), said DCE having a plurality of nodes with at least one client and at least one server, said method comprising the steps of:
   loading a DCE security tool in said DCE, said DCE security tool being an executable program; and
   in response to an input on one of said plurality of nodes:
      searching for a security problem in said DCE using said DCE security tool, said searching step including:
         calling a stand-alone executable program with parameters including a DCE ID and password;
         verifying a validity of said DCE ID and password; and
         identifying a violation if a default/original password provided to said DCE has not been changed; and
      outputting a result of said searching step including said violation, if found.

2. The method of claim 1, wherein said searching step includes the step of allowing a user to specify parameters for use during execution of said DCE security tool, wherein said parameters include:
   a path to place an output report; and
   a non-overwriting of previous report files.

3. The method of claim 1, wherein said searching step is performed in response to the steps of:
   determining that an identification (ID) running a DCE program is a root ID; and
   continuing the execution of said DCE program when said ID is a root ID.

4. The method of claim 1, wherein said searching step includes the steps of:
   determining that the DCE program is installed on a node; and
   continuing the execution of the DCE program when said DCE is installed on said node.

5. The method of claim 1, wherein said searching step includes the step of evaluating whether a default shipped DCE password associated with DCE IDs of a cell administrator and a root ID has been changed.

6. The method of claim 1, said searching step further comprising the steps of:
   checking an operating system resource (OSR) of said DCE;
   analyzing a plurality of files and directories found on a node of said DCE; and
   determining whether a permission and owner are verified for access to said DCE.

7. The method of claim 1, wherein said searching step includes the steps of:
   checking an operating system resource (OSR) of said DCE;
   issuing a warning when an OSR directory is missing; and
   reporting all other files not in compliance with a security standard as a violation.

8. The method of claim 1, wherein said searching step includes the steps of:
   checking a DCE server and a DCE/Open Systems Foundations (OSF) client;
   determining if an owner of a directory and nested directories and files is an administrator ID, wherein said administrator ID is an ID from among a plurality of userids and groupids;
   checking a permission of said nested directories and files when said owner is an administrator ID, wherein said checking step is a recursive function call which checks nested directories; and
   reporting a violation when said owner is not an administrator ID.

9. The method of claim 1, wherein said searching step includes the steps of:
   checking a client; and
   determining if a non-administrative user ID has access to DFS cache directories.

10. The method of claim 1, wherein said searching step includes the steps of:
    checking a DFS OSR;
    determining if a pre-specified set of directories are owned by root;
    determining whether said pre-specified set of directories are updatable by non-administrative userids; and
    checking the owner and permission on said pre-specified set of directories.

11. The method of claim 1, wherein said searching step includes the steps of:
    generating a report of any warnings or security violations found in DCE software; and
    producing a log file of any security violations or warnings.

12. The method of claim 1, wherein said searching step further includes the steps of:
    checking a program return of said tool to determine if it includes a warning or violation, or a system error; and
    sending an output to a system administrator.

13. An automated system for checking the adequacy of security in a distributed computing environment (DCE), said DCE having a plurality of nodes with at least one client and at least one server, said system comprising:
    means for loading a DCE security tool in said DCE, said DCE security tool being an executable program; and
    means for searching for a security problem in said DCE using said DCE security tool;
    means for determining if a default shipped DCE password for DCE IDs cell administrator and root has been changed; and
    means for outputting a result of said searching step and said determining step to a display monitor of said DCE.

14. The system of claim 13, wherein said searching means includes the means for allowing a user to specify parameters for use during execution of said DCE security tool, wherein said parameters include:

a path to place an output report; and
a non-overwriting of previous report files.

15. The system of claim 13, wherein said searching means is performed in response to:
   means for determining that an identification (ID) running a DCE program is a root ID; and
   means for continuing the execution of said DCE program when said ID is a root ID.

16. The system of claim 13, wherein said searching means includes:
   means for determining that the DCE program is installed on a node; and
   means for continuing the execution of the DCE program when said DCE is installed on said node.

17. The system of claim 13, wherein said searching means includes:
   means for calling a stand-alone executable program with parameters including a DCE ID and password;
   means for verifying a validity of said DCE ID and password; and
   means for identifying a violation if a default/original password provided to said DCE has not been changed.

18. The system of claim 13, said searching means further comprising:
   means for checking an operating system resource (OSR) of said DCE;
   means for analyzing a plurality of files and directories found on a node of said DCE; and
   means for determining whether a permission and owner are verified for access to said DCE.

19. The system of claim 13, wherein said searching means includes:
   means for checking an operating system resource (OSR) of said DCE;
   means for issuing a warning when an OSR directory is missing; and
   means for reporting all other files not in compliance with a security standard as a violation.

20. The system of claim 13, wherein said searching means includes:
   means for checking a DCE server and a DCE/Open Systems Foundations (OSF) client;
   means for determining if an owner of a directory and nested directories and files is an administrator ID, wherein said administrator ID is from a list which includes a plurality of userids and groupids;
   means for checking a permission of said nested directories and files when said owner is an administrator ID, wherein said checking means is a recursive function call which checks nested directories; and
   means for reporting a violation when said owner is not an administrator ID.

21. The system of claim 13, wherein said searching means includes:
   means for checking a client; and
   means for determining if a non-administrative user ID has access to DFS cache directories.

22. The system of claim 13, wherein said searching means includes:
   means for checking a DFS OSR;
   means for determining if a pre-specified set of directories are owned by root;
   means for determining whether said pre-specified set of directories are updatable by non-administrative userids; and
   means for checking the owner and permission on said pre-specified set of directories.

23. The system of claim 13, wherein said searching means includes:
   generating a report of any warnings or security violations found in DCE software; and
   means for producing a log file of any security violations or warnings.

24. The system of claim 13, wherein said searching means further includes:
   means for checking a program return of said tool to determine if it includes a warning or violation, or a system error; and
   means for sending a mail output to a system administrator.

25. An automated computer program product comprising:
   a computer readable storage medium; and
   program code on said computer readable medium that when executed by a processing device enables the device to perform the function of checking the adequacy of security in a distributed computing environment (DCE), said DCE having a plurality of nodes with at least one client and at least one server, said program code further comprising code for performing the functions of:
      loading a DCE security tool in said DCE, said DCE security tool being an executable program; and
      in response to an input on one of said plurality of nodes, searching for a security problem in said DCE using said DCE security tool;
      determining if a default shipped DCE password for DCE IDs cell administrator and root has been changed; and
      outputting a result of said searching step and said determining step to an output device of said DCE.

26. The computer program product of claim 25, wherein said program code for said searching means includes program code for allowing a user to specify parameters for use during execution of said DCE security tool, wherein said parameters include:
   a path to place an output report; and
   a non-overwriting of previous report files.

27. The computer program product of claim 25, wherein said program code for said searching means is performed in response to:
   program code for determining that an identification (ID) running a DCE program is a root ID; and
   program code for continuing the execution of said DCE program when said ID is a root ID.

28. The computer program product of claim 25, wherein said program code for said searching means includes:
   program code for determining that the DCE program is installed on a node; and
   program code for continuing the execution of the DCE program when said DCE is installed on said node.

29. The computer program product of claim 25, wherein said program code for said searching means includes:
   program code for calling a stand-alone executable program with parameters including a DCE ID and password;
   program code for verifying a validity of said DCE ID and password; and
   program code for issuing a violation report if a default password provided to said DCE has not been changed.

30. The computer program product of claim 25, said program code for said searching further comprising:
   program code for checking an operating system resource (OSR) of said DCE;
   program code for analyzing a plurality of files and directories found on a node of said DCE; and
   program code for determining whether a permission and owner are verified for access to said DCE.

31. The computer program product of claim 25, wherein said program code for said searching includes:

program code for checking an operating system resource (OSR) of said DCE;

program code for issuing a warning when an OSR directory is missing; and program code for reporting all other files not in compliance with a security standard as a violation.

32. The computer program product of claim 25, wherein said program code for said searching includes:

program code for checking a DCE server and a DCE/Open Systems Foundations (OSF) client;

program code for determining if an owner of a directory and nested directories and files is an administrator ID, wherein said administrator ID is from a list which includes a plurality of userids and groupids;

program code for checking a permission of said nested directories and files when said owner is an administrator ID, wherein said program instructions for said checking means is a recursive function call which checks nested directories; and program code for reporting a violation when said owner is not an administrator ID.

33. The computer program product of claim 25, wherein said program code for said searching includes:

program code for checking a client; and program code for determining if a non-administrative user ID has access to DFS cache directories.

34. The computer program product of claim 25, wherein said program code for said searching includes:

program code for checking a DFS OSR;

program code for determining if a pre-specified set of directories are owned by root;

program code for determining whether said pre-specified set of directories are updatable by non-administrative userids; and program code for checking the owner and permission on said pre-specified set of directories.

35. The computer program product of claim 25, wherein said program code for said searching includes:

program code for generating a report of any warnings or security violations found in DCE software; and program code for producing a log file of said security violations or warnings.

36. The computer program product of claim 25, wherein said program code for said searching further includes:

program code for checking a program return of said tool to determine if it includes a warning or violation, or a system error; and program code for sending a mail output to a system administrator.

* * * * *